Jan. 26, 1932. E. C. BAUGHMAN 1,842,709
ICE CREAM DIPPER
Filed July 14, 1930
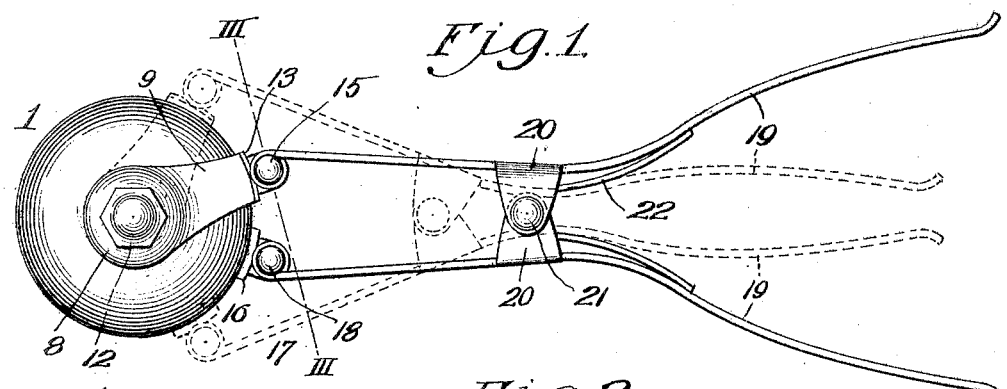
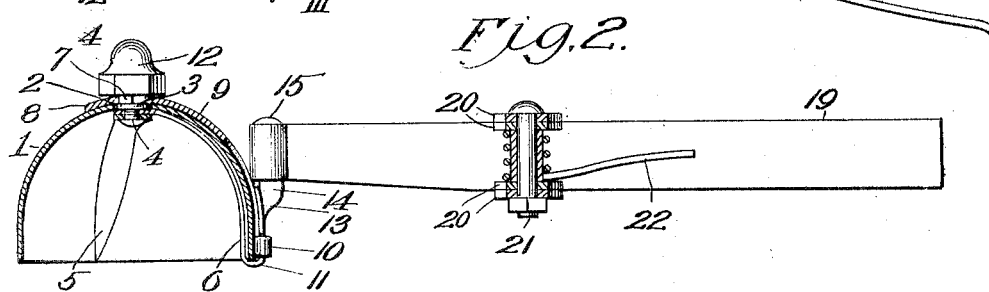
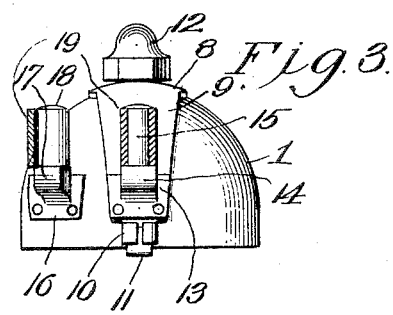
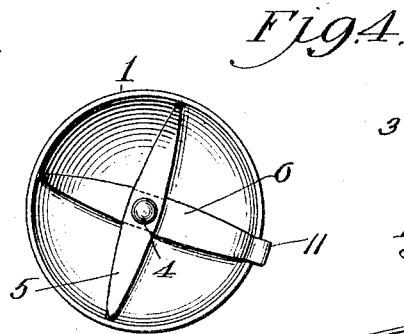
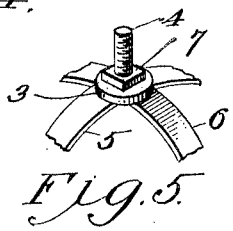
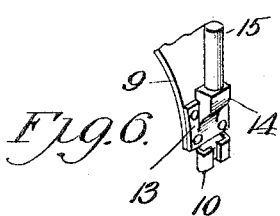
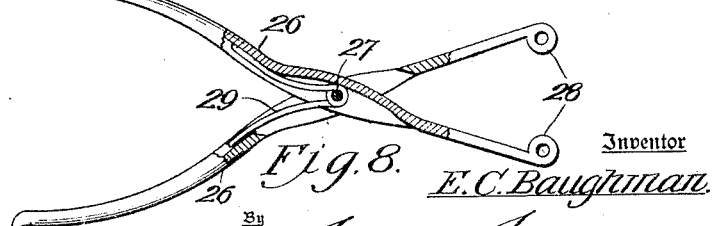
Inventor
E. C. Baughman
By Thorpe & Thorpe
Attorneys Patented Jan. 26, 1932

1,842,709

UNITED STATES PATENT OFFICE

EDSON C. BAUGHMAN, OF KANSAS CITY, MISSOURI

ICE CREAM DIPPER

Application filed July 14, 1930. Serial No. 467,703.

This invention relates to ice cream dippers of that type used in dipping a substantially uniform or measured quantity of ice cream for deposit in ice cream cones, for sodas and the like. It also is of that type comprising a cup of substantially hemispherical or conical form containing a knife or cutter and a handle connected to the cup and to the cutter for effecting simultaneous reverse rotation of said elements for the purpose of separating the cream gathered up by the cup from the interior wall thereof through the action of the knife or cutter so that the cream may be readily deposited within an ice cream cone or soda glass or the like.

The object of the invention is to produce an efficient ice cream dipper of the general class referred to, which is of very simple, strong and durable construction and which can be made and sold at low cost.

With this object in view the invention consists in certain novel and useful features and combinations of parts as hereinafter described and claimed; and in order that it may be fully understood, reference is to be had to the accompanying drawings, in which:

Figure 1 is a top plan view of an ice cream dipper embodying the invention.

Figure 2 is a central vertical longitudinal section of the same.

Figure 3 is a cross section taken on the line III—III of Figure 1.

Figure 4 is an inverted or inner face view of the cup element and the knife or cutter therein.

Figure 5 is a fragmental perspective view of the knife or cutter.

Figure 6 is a fragmentary perspective view of the parts whereby one arm of the handle is connected to the cutter for effecting rotation thereof.

Figure 7 is a plan view of a modified form of the handle.

Figure 8 is a plan view of another modified form of the handle, said Figure being broken away to more clearly indicate the spring for reversing the action of the cutter and the cup after they have been turned to loosen the ice cream picked up by the cup.

Referring now to the drawings in detail, 1 indicates a thin metal cup, shown as of substantially hemispherical form but which may be of conical or any other suitable form, and said cup at its apex is provided with a journal opening 2 snugly receiving the circular bearing boss 3 rigid with the vertical screw 4 utilized for securing rigidly to said bearing boss the crossed blades 5 and 6 constituting the knife or cutter of the device. The said blades are of arched or analogous form to correspond with and fit snugly against the interior surface of the cup, so that when relative rotation is imparted to the cup and cutter the charge of ice cream within the former shall be released therefrom or loosened so as to fall or be readily dislodged therefrom. The bearing boss 3 has secured rigidly to it or formed integrally with it an upstanding angular projection 7 and snugly fitting the upper or exterior side of the journal boss and disposed upon the outer or exterior side of the cup is a cap 8, said cap having a central opening conforming to and snugly fitting on the angular projection 7, so that rotary motion imparted to said cap shall impart like rotation or motion to the cutter.

The cap 8 is provided with an arm 9 which, in the construction shown, is curved and fits snugly upon the exterior surface of the cup and extends radially thereof and near the lower edge of the cup has lateral arms which are bent toward each other so as to form a vertically disposed keeper 10 which receives the upturned end or hook 11 formed at the lower end of one of the blades. By this arrangement, as will hereinafter appear, lateral force applied upon the arm 9 not only tends to rotate the cutter through the engagement of the cap 8 with the projection 7, but also through lateral pressure applied by the keeper on the upturned end or hook 11 of said cutter blade, and to guard against dislocation of the cap 8 from the angular projection 7, a socket nut 12 engages the upper end of the bolt 4 and when screwed home is arrested by engagement by the angular projection 7 so that it shall not apply a clamping pressure on the cap which would impose such friction as to interfere with its freedom in turning.

A bracket 13 is riveted or otherwise rigidly secured to the lower end of the arm 9 at the exterior side thereof, and said bracket is formed with a central upstanding enlargement 14 and a pivot post 15 rising from said enlargement. A similar bracket 16 is rigidly secured to the cup on its exterior side, and said bracket likewise preferably has a central enlargement 17 and upstanding pivot post 18.

In the preferred construction the handle is composed of two members 19, each provided with a pair of inwardly projecting ears 20, the ears of one member overlapping the ears of the other member, and extending through and uniting said ears is a pivot 21. A spring 22 of any suitable type, is employed for the purpose of normally holding the rear ends of the members 19 spread apart. As shown the spring is mounted on the pivot 21 and has its ends between and bearing outwardly against the respective members. The front ends of the arms pivotally engage the posts 15 and 18 respectively and bear at their lower ends upon the enlargements 14 and 17 respectively of the brackets secured to the arm 9 and the cup. To retain the handle upon the pivot posts 15 the upper ends of the latter may be upset as shown, or any equivalent means may be employed.

From the foregoing it will be apparent that the device is gripped at the rear end in the operator's hand and then manipulated to dip up a charge of ice cream from a freezer or the like. The cup is then placed over a cone or other object or receptacle in inverted position as shown in Figure 2. The operator then applies compressible force on the handle through the holding hand and thus effects simultaneous reverse rotation of the cup and cutter to release the charge of ice cream from the cup, and when this is accomplished and the pressure is relaxed upon the handle, the spring reverses the action of the handle and hence of the cup and cutter so that the device is then ready for another dipping operation.

Referring now to Figure 7, it will be noticed that it is composed of a pair of arms or members 23 having pivot-receiving sockets 24 at their free ends and having their opposite ends united by a rounded or elliptic portion 25 constituting a spring for spreading the opposite ends of the members apart. Figure 8 shows a crossed lever type of handle, the same consisting of two intersecting members 26 connected by an intermediate pivot 27 and provided at their front ends with pivot sockets 28. With this type, a spring 29 is fitted around the pivot and engages the members rearward thereof to apply outward pressure thereon. With this type of handle and with the type shown by Figure 7, compressive pressure applied by the gripping hand effects simultaneous rotation of the cup and cutter. In this case however the normal position of the posts 15 and 18 will correspond to the dotted line positions of said elements in Figure 1, so that compressive action applied by the hand will cause said posts to approach as distinguished from moving apart as true of the construction disclosed by Figure 1, and when the grip is released the spring action of members 23 and spring 29 of Figures 7 and 8 respectively, will cause the posts 15 and 18 respectively to move apart preliminarily to the next dipping operation.

From the above description, it will be apparent that I have produced an ice cream dipper of the character outlined which possesses the features of advantage enumerated as desirable, and while I have described and claimed the preferred embodiments of the same, I reserve the right to make all changes properly falling within the spirit and scope of the appended claims.

I claim:

1. An ice cream dipper comprising a cup, a bearing journaled in the cup at the apex of the latter, a cutter fitting in and against the inner face of the cup and rigid with said bearing boss, a cap disposed exteriorly of the cup and bearing a rigid relation to the bearing boss, and provided with an arm extending toward the lower edge of the cup provided at its lower end with a keeper; the cutter having a hook terminal extending around the lower edge of the cup and interlocked as regards lateral movement with the said keeper of said arm, and a two-member handle pivotally connected respectively to said arm and the cup and adapted for imparting simultaneous reverse rotation to the cup and cutter.

2. In an ice cream dipper, a cap member provided with an arm terminating in a vertically disposed keeper, and a bracket secured rigidly to said arm and provided with a pivot post.

3. In an ice cream dipper, a cap provided with an arm having a keeper, a circular bearing boss rigid and coaxial with said cap, and an arched cutter rigid with the boss and below the same and provided with an upturned hook terminal engaging said keeper.

In testimony whereof I affix my signature.

EDSON C. BAUGHMAN.